US012638031B2

(12) United States Patent
Bernal

(10) Patent No.: US 12,638,031 B2
(45) Date of Patent: May 26, 2026

(54) SEPARATOR FOR WING TRAP

(71) Applicant: Ricardo Alvarado Bernal, Mexico City (MX)

(72) Inventor: Ricardo Alvarado Bernal, Mexico City (MX)

( * ) Notice: Subject to any disclaimer, the term of this patent is extended or adjusted under 35 U.S.C. 154(b) by 14 days.

(21) Appl. No.: 18/756,226

(22) Filed: Jun. 27, 2024

(65) Prior Publication Data

US 2025/0271008 A1     Aug. 28, 2025

(30) Foreign Application Priority Data

Feb. 23, 2024    (MX) .................... MX/a/2024/002387

(51) Int. Cl.
*F16B 2/10*          (2006.01)
*A01M 1/10*          (2006.01)

(52) U.S. Cl.
CPC ............... *F16B 2/10* (2013.01); *A01M 1/106* (2013.01)

(58) Field of Classification Search
CPC ................................... F16B 2/10; A01M 1/106
See application file for complete search history.

(56) References Cited

U.S. PATENT DOCUMENTS

| | | | | |
|---|---|---|---|---|
| 3,896,527 | A * | 7/1975 | Miller | A61M 25/02 24/DIG. 22 |
| 5,428,871 | A * | 7/1995 | Iosif | B65D 33/1675 24/30.5 R |
| D423,353 | S * | 4/2000 | Blanchard | D9/435 |
| 9,220,507 | B1 * | 12/2015 | Patel | A61B 17/064 |
| 9,282,972 | B1 * | 3/2016 | Patel | A61B 17/1227 |
| 2004/0255436 | A1 * | 12/2004 | Fujii | B65D 33/1675 24/521 |
| 2006/0107502 | A1 * | 5/2006 | Fujii | A61M 39/284 24/543 |
| 2012/0174349 | A1 * | 7/2012 | Fannon | H02G 3/32 24/457 |
| 2013/0240684 | A1 * | 9/2013 | Meyers | H02G 3/32 248/74.1 |
| 2015/0291321 | A1 * | 10/2015 | Ecker | F16B 2/10 24/30.5 R |

* cited by examiner

*Primary Examiner* — David M Upchurch
(74) *Attorney, Agent, or Firm* — Nixon & Vanderhye PC

(57) ABSTRACT

A separator has a securing element and a support element. both elements are articulated together at one end with a fold line that acts as a hinge between the two elements, allowing the securing element to fold over the support element. When folded, the upper face of the securing element aligns with the upper face of the support element, so that a wire can be inserted between the two faces. This wire is secured and allows for determining the opening distance of a wing trap.

8 Claims, 7 Drawing Sheets

17          24

30

13

13

1

40

40

40

40

40

SEPARATOR FOR WING TRAP

CROSS-REFERENCE TO RELATED APPLICATIONS

This application claims priority to MX/a/2024/002387 filed Feb. 23, 2024, the entire contents of which are hereby incorporated by reference.

BACKGROUND

1. Field of the Invention

This invention relates to the monitoring and control of pests, more specifically to an insect trap, and even more particularly to a separator used in a wing trap.

2. General Background of the Invention

Throughout time, humanity has attempted to control insects that are harmful to crops. However, the wide variety of insects and their resistance over the years forces us to improve our methods of controlling these insects. Consequently, there are more sophisticated control methods, including insect traps with very particular characteristics aimed at specific types of insects. In this context, insect traps are made in different types, allowing for increasingly precise control by having the most suitable trap for the insect to be controlled or monitored.

Monitoring and controlling insect populations can be carried out using insect traps, which come with various specifications depending on the type of insect to be controlled, as mentioned. Along these lines, improvements are made to the accessories present in each insect trap. Therefore, a trap separator has been developed, which improves the efficiency of insect traps. It is important to note that multiple varieties have been developed to cover this accessory but without achieving an insect trap separator like the one achieved in the present invention. It is important to look at different types of trap separators that have been implemented, which present different configurations compared to the one developed in our invention.

Here is shown the Patent Application US 2007/0094915 A1 by Plato et al., dated May 3, 2007, titled "Insect Trap for Capturing Numerous Species of the Order Lepidoptera and Method of Operation Thereof." In this trap, a separator for parts of the insect trap can be seen, which, through supports, performs the function of separating these parts. However, to perform this function, supports and a post where these supports will be placed are needed to achieve the separation of the trap parts. This invention has additional elements to the insect trap that make it difficult to arrange all the elements for its operation in elevated parts such as a tree.

Another example of such separators is found in the Utility Model KR 20100000227 U1, by Jeongsik Lee, dated Jan. 7, 2010, titled "Tunnel-Type Pest Trap." In this invention, a tunnel type is constructed with walls impregnated with an attractant. When assembling the tunnel, initially presented in a flat preform, holes are used to insert a cord that serves as support and controls the opening of the assembled tunnel, thus creating the required space for insects to enter the trap. However, it is not possible to reuse or open this tunnel-type trap once assembled, as doing so would lose the initial opening and contaminate the attractants due to the preform's arrangement.

Wire separators have also been made, which allow space for a wing trap. These separators are generally made manually in the field where these traps are to be placed. In this regard, these separators are practical in their execution, with the craftsmanship depending on the skill of the person responsible for this task. However, these separators do not standardize the openings of the traps, nor do they allow for reuse, as they generally become deformed. Currently, crudely bent wires are used. The bends in these wires or hooks are formed after being inserted into the upper part of the trap. This process is done manually, and the bends are inconsistent and difficult to form. This operation is very laborious and causes problems, not only in assembling the trap but also in failing to firmly secure the base of the trap. In situations with strong winds, these bases are lost due to not being firmly secured. Another way to form the wing trap is by using a pair of straws cut to a specific size. However, the disadvantage is that when the base of the trap, which is impregnated with insect-holding glue, needs to be discarded, it is necessary to completely disassemble the trap and separate both parts. The upper part (lid) is attached to the lower part (base) by a hook that passes through both parts.

From the background information mentioned and existing solutions, no wing trap separator with the characteristics we propose has been found. Therefore, we recognize the need for a wing trap separator, leading to the development of the present invention, which is detailed below.

SUMMARY OF THE INVENTION

The present invention relates to a separator for a wing trap, which will improve the efficiency of wing traps, as this separator features characteristics that enhance the efficiency and quality of the performance of these traps.

This separator facilitates the assembly of the trap, in addition to controlling a specific separation required for the capture of moths and insect pests that are monitored and trapped in this type of trap.

This separation is important for the placement of attractants and the airflow that enters and disperses the active ingredients of these attractants.

Additionally, this specific separation allows insects to enter based on their size and flight behavior.

With our separator, the upper part (lid) is securely attached to the lower part (base) and can easily be detached from one another without having to disassemble the trap.

When between 50 to 100 traps are placed per hectare, it results in a time-saving advantage, which is an important economic factor at the end of the day.

Therefore, the object of the present invention is to provide a separator for wing traps that aids in the monitoring and control of insects.

BRIEF DESCRIPTION OF THE DRAWINGS

To complement the description being made and to aid in a better understanding of the characteristics of the invention, the present description is accompanied by the following drawings, which are an integral part of it and have been illustrated and include, but are not limited to.

DETAILED DESCRIPTION OF THE INVENTION

The following is a detailed description of the present invention with reference to the figures.

Figure 1:
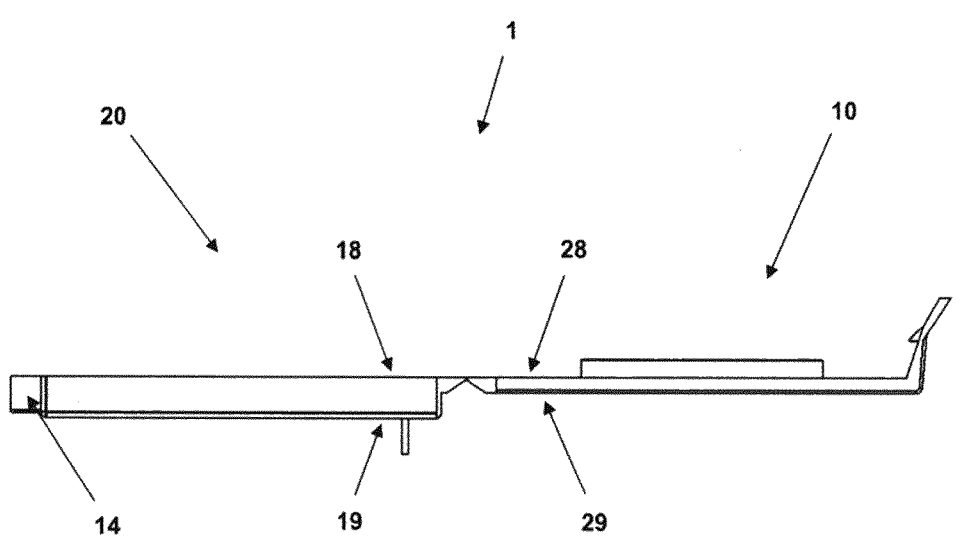
FIG. 1. Shows a side view of the separator for the wing trap.
Figure 2:
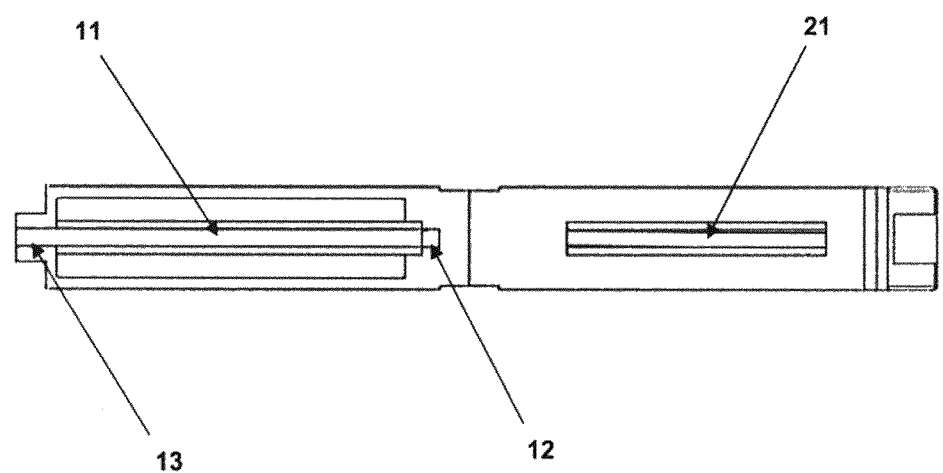
FIG. 2. Shows a top view of the separator for the wing trap.
Figure 3:
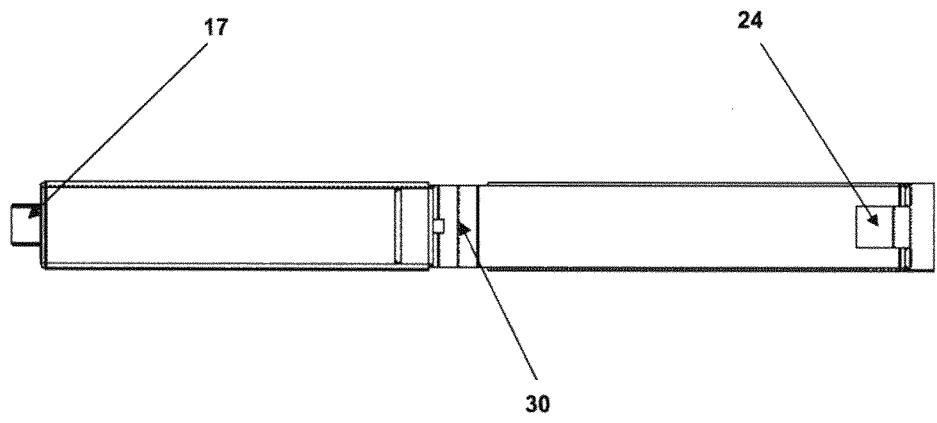
FIG. 3. Shows a bottom view of the separator for the wing trap.

According to the present invention, the separator for the wing trap 1 comprises a securing element 20 and a support element 10 (see FIG. 1). Both elements are articulated together at one contiguous end, thus forming a fold line 30 (see FIGS. 1 to 3) that acts as a hinge between the securing element 20 and the support element 10. This arrangement allows the securing element 20 to be folded over the support element 10, or vice versa. When folded, the upper face 18 of the securing element aligns with the upper face 28 of the support element, as both faces have the same length and width. This alignment makes it possible to secure a wire 40 between the two surfaces. The upper face 28 of the support element has a surface substantially equal to the upper face 18 of the securing element, allowing the piece to interact with a securing channel of the wire 11 against the wire support channel 21 (see FIG. 2). These elements will secure the wire when folded.

Figure 8:
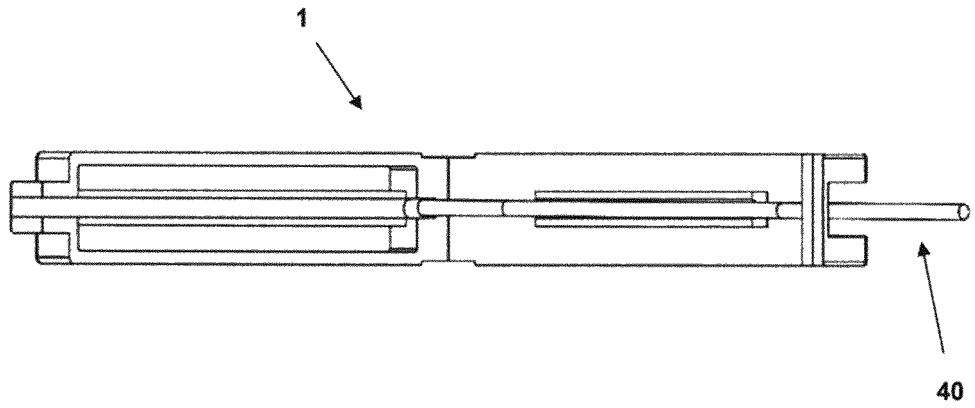
FIG. 8. Shows a top view in the open position of the separator for the wing trap with the wire inserted.
Figure 9:
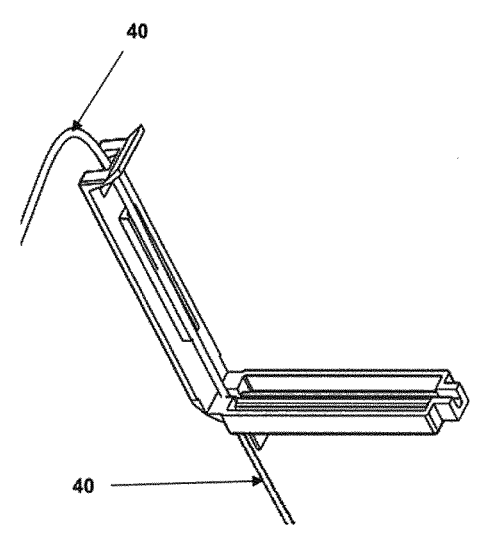
FIG. 9. Shows a side isometric view of the separator for the wing trap being folded with the wire inserted.
Figure 10:
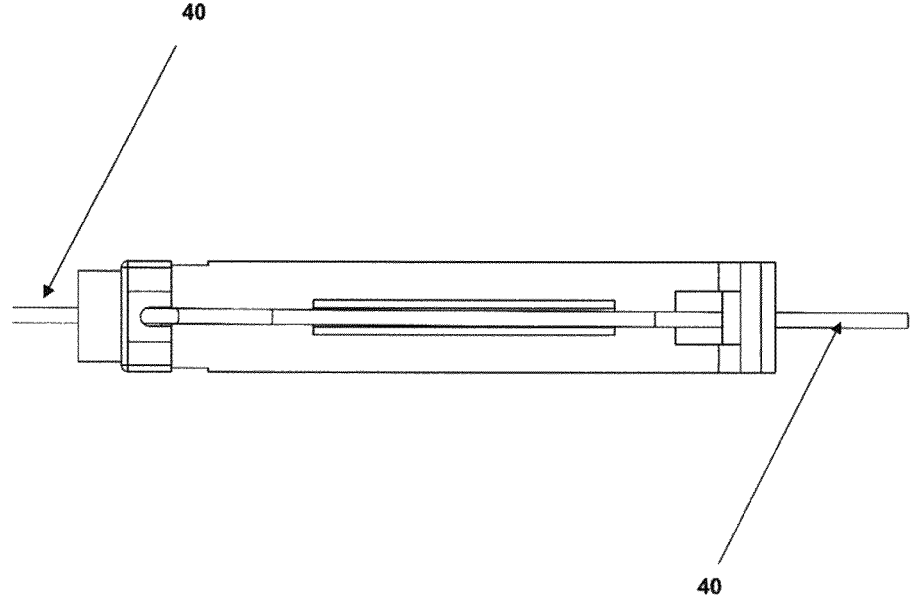
FIG. 10. Shows a top view in the closed position of the separator for the wing trap with the wire inserted.

The separator for the wing trap 1 includes two elements joined by a hinge or fold line 30. The securing element 20 has the shape of a longitudinal box or a hollow rectangular prism, with an initial channel space 12 at one end near the fold line 30 (see FIGS. 2, 3, 5, 6, 8, and 9), and a rectangular projection at the opposite end of the securing element 20 forming a latch 14 (see FIGS. 1 and 5). The arrangement of the initial channel space 12, the wire securing channel 1, and the wire exit guide 13 are aligned, allowing for the longitudinal insertion of a wire 40 to open and close the securing element 20 against the support element 10, as seen in FIGS. 8, 10, and 1. It is worth mentioning that these three parts—the initial channel space 12, the wire securing channel 1, and the wire exit guide 13—are aligned below the upper face 18 of the securing element 20, enabling the placement of the wire 40 in this alignment without protruding from the upper face 18.

The separator for the wing trap 1, with its support element 10, has the shape of a longitudinal rectangular plate. On its upper face 28, it features a wire support channel 21 (see FIG. 2), which does not span the entire length of the surface 28, leaving a space 22 between the wire support channel 21 and the fold line 30. Similarly, at the opposite end of the wire support channel 21, there is a free space that does not reach the end of the support element 10. These separations allow for the proper manipulation and bending when inserting the wire into the wire support channel 21. Once the wire 40 is mounted on the support channel 21, as seen in FIGS. 8 and 9, the support element 10 can be folded with the securing element 20 in such a way that the wire 40 and the support channel 21 are enclosed within the cavity of the securing element 20.

Figure 4:
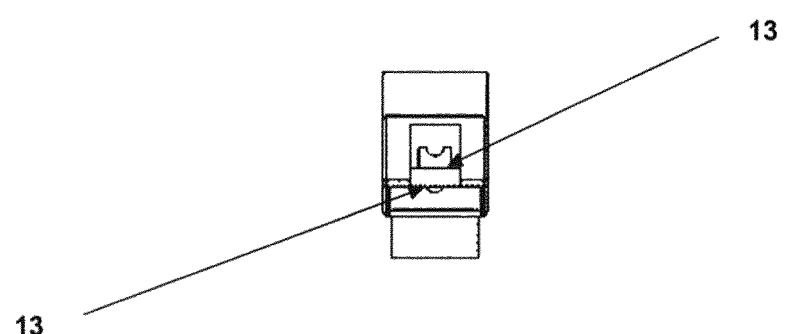
FIG. 4. Shows a front view of the separator for the wing trap.
Figure 5:
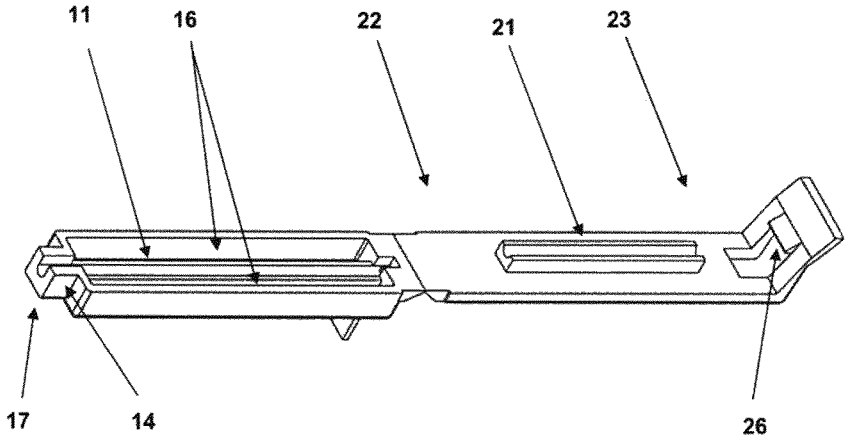
FIG. 5. Shows an isometric top view of the separator for the wing trap.
Figure 6:
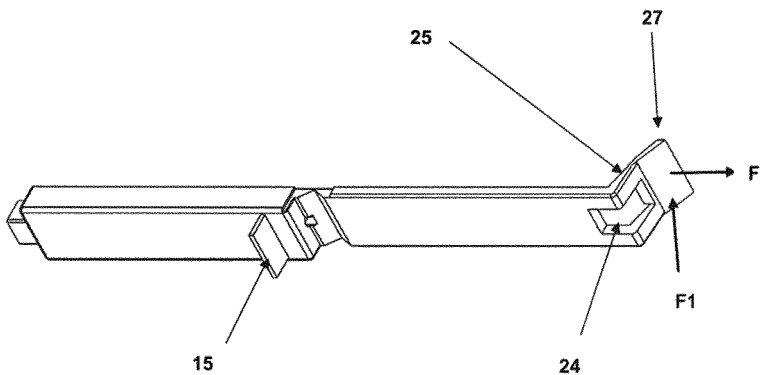
FIG. 6. Shows an isometric bottom view of the separator for the wing trap.
Figure 7:
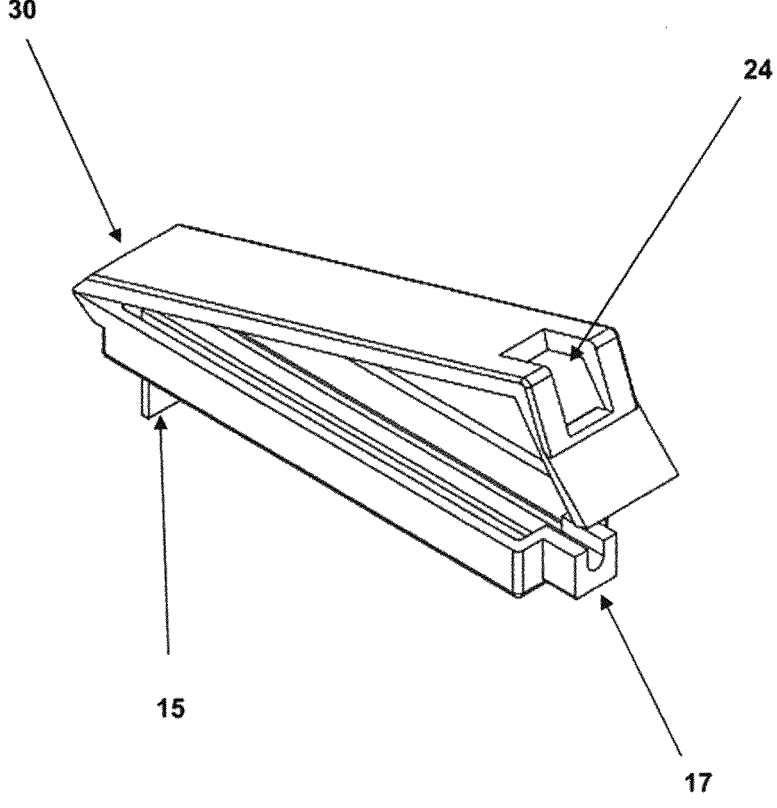
FIG. 7. Shows an isometric front view in the closing position of the separator for the wing trap.
Figure 11:
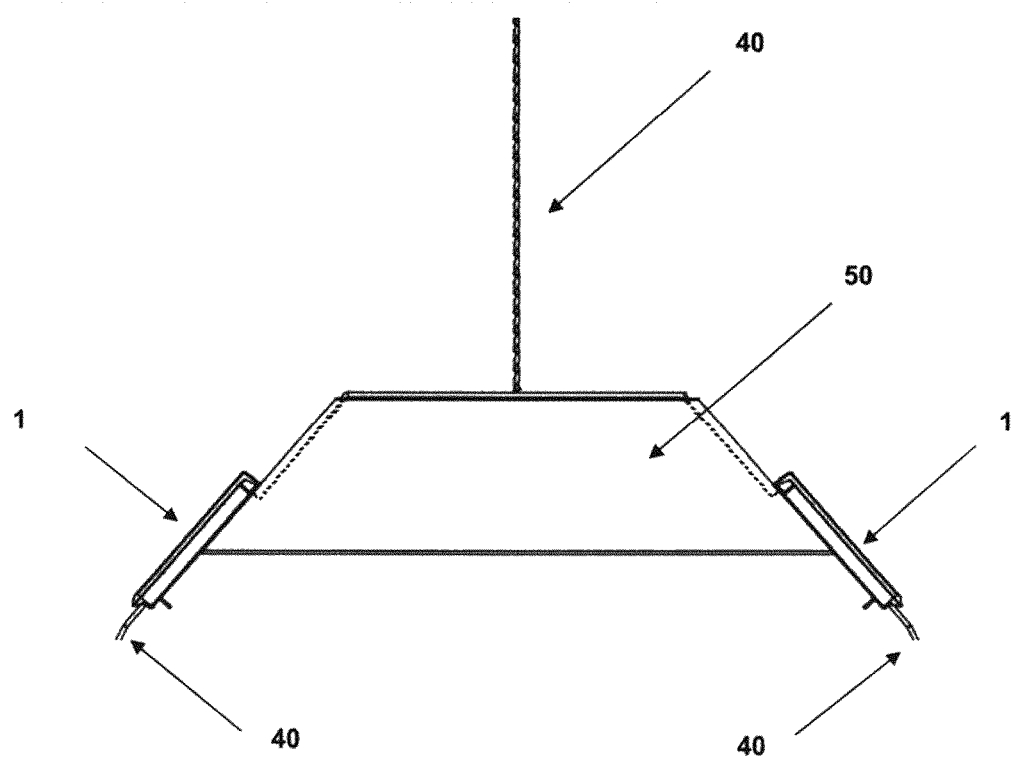
FIG. 11. Shows a front view of the separator placed in the wing trap together with the wire.

In FIGS. 5 and 6, it is shown that at the opposite end of the fold line 30 of the support element 10, there is a tab support 25 inclined towards the initial channel space 12 and the final channel space 23. This tab support 25 has a locking slot 24, which allows the insertion of the latch 14. Additionally, on the tab support 25, there is a pin tab 27 located at the end, with a slight inclination similar to the tab support 25. The pin tab 27 has an internal pin 26, which allows it to engage with the latch 17 (see FIGS. 3, 5, and 7). When folding the securing channel 1 against the support element 10, specifically against the wire support channel 21, as shown in FIG. 7, the engagement part of the latch 17 locks with the pin 26 when both parts are folded, thus joining both parts as shown in FIGS. 4, 10, and 11. It is worth noting that the pin can be manipulated by a user by applying a small force "F1" in the direction of the pin tab 27 when closing and a force "F" when opening the pin, as seen in FIG. 6.

In FIGS. 6 and 7, the numeral 15 indicates the separation tab. This tab is located on the lower face 19 of the securing element 20, situated at an end near its fold line 30. The separation tab 15 is arranged perpendicularly to the lower face 19 of the securing element 20. This separation tab allows for a specific separation between the wings of the wing trap to create a fixed opening for insect entry. The separation tab can be adjusted along the lower face 19 of the securing element 20 to achieve openings according to the needs of the insect to be captured.

The purpose of the separation tab 15 is to stabilize and eliminate the movement of the trap base, keeping it in a constant position.

The space between the channel fold 22 and the fold line 30 has a specific measurement to accommodate the edge of the trap base, which is inserted between the support element 10 and the securing element 20 of the separator.

FIGS. 8 to 10 show the arrangement of the wire 40 passing through the locking slot 24, then being placed on the support channel 21 of the support element 10, and finally exiting through the initial channel space 12 of the securing element 20. Once positioned, the wing trap separator is folded and secured with the pin in the latch engagement, firmly holding the wire that has passed through the wing trap separator 1. This separator will allow for a predetermined distance achieved between the separation tab 15 and the tab support 25, which will establish the separation of the wings of a wing trap.

FIG. 1 shows how the separator 1 adapts to the upper part of the wing trap, held by wires at both its upper and lower parts.

To better provide an understanding of the invention, a list of parts that constitute the separator for the wing trap is presented.

1 Separator for Wing Trap
20 Securing Element
11 Wire Securing Channel
12 Initial Channel Space
13 Final Channel Space
14 Latch
15 Separation Tab
16 Hollow Channel Space
17 Latch Engagemen
18 Upper Face of Securing Element
19 Lower Face of Securing Element
10 Support Element
21 Wire Support Channel

22 Space Between Channel and Fold Line
23 Final Channel Space
24 Locking Slot
25 Tab Support
26 Pin
27 Pin Tab
28 Upper Face of Support Element
29 Lower Face of Support Element
30 Fold Line
40 Wire
50 Upper Lid of Wing Trap
F1 Closing Force of Separator
F Opening Force of Separator

The invention claimed is:

1. A separator for a wing trap, comprising:

a securing element in the shape of a longitudinal box, with an initial channel space at one end near a fold line and a rectangular projection at the opposite end of said securing element forming a latch, where an arrangement of the initial channel space, a wire exit guide arranged in the latch on an upper part of the securing element, and a securing channel are aligned; and a support element in the shape of a longitudinal rectangular plate having, on an upper surface, a wire support channel, wherein the wire support channel does not span the entire length of the upper surface as the wire support channel has spaces at the start and the end of the upper surface, as well as a pin tab, and the securing element and the support element are aligned at an upper face of the securing element and an upper face of the support element when folding a wing trap separator through the fold line, and securing the wing trap separator by means of the latch and the pin tab.

2. The separator for the wing trap according to claim 1, wherein the support element has, at the opposite end of the fold line of the support element, a tab support arranged inclined from the initial channel space towards a final channel space with respect to the upper face of the support element, and the tab support has a locking slot.

3. The separator for the wing trap according to claim 1, wherein a tab support has a pin tab located at an end with an inclination in a same direction as the tab support, the pin tab has an internal pin, which allows the pin tab to engage a latch engagement or pin so that when folding the securing element against the support element, the latch engagement part locks with the pin, thereby joining both parts.

4. The separator for the wing trap according to claim 1, wherein a pin can be manipulated by a user by applying a small force "F1" in the direction of the pin tab when the pin is to be closed, and a force "F" when the pin is to be opened.

5. The separator for the wing trap according to claim 1, wherein a separation tab is located on a lower face of the securing element near the fold line, and the separation tab is arranged perpendicularly to the lower face of the securing element.

6. The separator for the wing trap according to claim 1, wherein a wire passes through a locking slot, then is placed on the wire support channel of the support element, and finally exits through the initial channel space of the securing element, and once positioned, the wing trap separator is folded and secured by means of the pin in a latch engagement, firmly holding the wire that has passed through the wing trap separator.

7. The separator for the wing trap according to claim 1, wherein the separator performs separation through a separation tab and a tab support, which allow for the separation of wings of the wing trap separator.

8. The separator for the wing trap according to claim 1, wherein a separation tab can vary its position along a lower face of the securing element to achieve openings according to the requirements of the insect to be captured.

* * * * *